May 16, 1961 C. S. ROBERTS 2,984,549

SEMICONDUCTOR PRODUCT AND METHOD

Filed June 21, 1957

INVENTOR.
Cornelius Sheldon Roberts
BY [signature]
ATTORNEYS

United States Patent Office 2,984,549
Patented May 16, 1961

2,984,549

SEMICONDUCTOR PRODUCT AND METHOD

Cornelius Sheldon Roberts, Los Altos, Calif., assignor, by mesne assignments, to Clevite Corporation, Cleveland, Ohio, a corporation of Ohio Filed June 21, 1957, Ser. No. 667,106

7 Claims. (Cl. 41—42)

Figure 1:
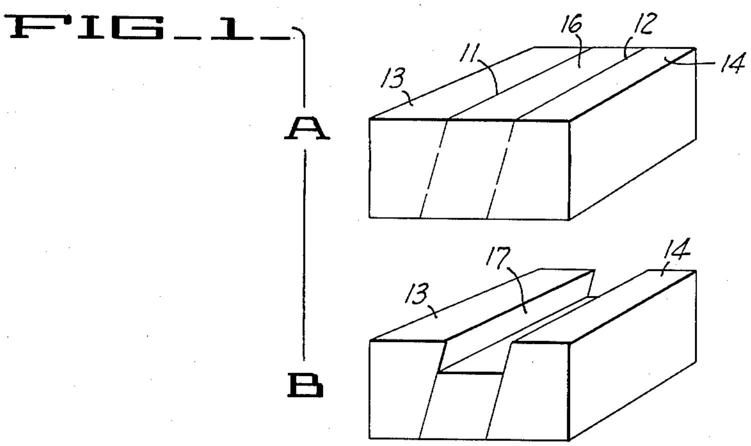

This invention relates generally to a semiconductor product and method of manufacture.

In copending application Serial No. 605,646 filed August 22, 1956, entitled "Junction Transistor," there is described a transistor structure in which the base layer has a varying thickness whereby the transistor may be operated at relatively high frequencies and high powers. One of the configurations described includes a plurality of relatively thick ribs with relatively thin regions connecting the same. In making the transistor, the first step is to form a block of semiconductive material which has one surface grooved with a plurality of parallel grooves.

In copending application Serial No. 652,117, filed April 11, 1957, entitled "Transistor Structure and Method," there is described a field effect transistor in which the source, drain and channel regions are formed on one surface of a block of material with the block serving as the gate region. The structure is formed by subjecting a block of semiconductive material to a diffusion operation and then grooving one surface to a suitable depth to form a relatively thin channel region disposed between relatively thick source and drain regions.

In said copending applications various chemical and mechanical methods of forming the grooves are described. For example, the grooves may be formed by masking and then etching the surface. Alternatively, the surface may be mechanically operated on such as by sawing, scratching and the like, to form a plurality of relatively parallel grooves. In all of these methods it is rather difficult to obtain well defined grooves which are relatively uniform in width and depth and which tend to run substantially parallel to one another.

It is an object of the present invention to provide an improved method for forming a block of semiconductive material having a grooved surface.

It is another object of the present invention to provide a semiconductor product and method in which a block of semiconductive material having a grooved surface is formed by presenting different crystallographic faces to an etching solution.

It is another object of the present invention to grow a crystal with one or more twin boundaries whereby different crystallographic faces are present at the surface. The block is then etched. The material is etched at different rates depending upon the crystallographic face which is presented to the etching solution. The resulting contour of the surface is grooved.

The invention will appear more clearly from the following detailed description when taken in conjunction with the accompanying drawing.

Figure 2:
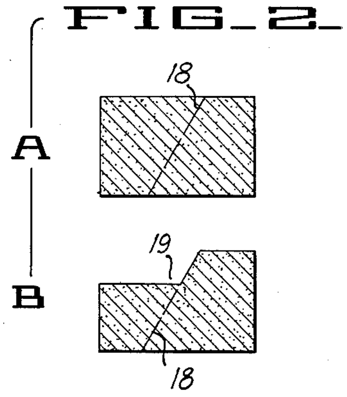

Referring to the drawing:

Figures 1A–B show the steps of forming one semiconductor product in accordance with the invention;

Figures 2A–B show the steps in forming a semiconductor product having a step.

Figures 3A–B show the steps in forming a field effect transistor employing the method of the invention; and Figures 4A–B show the method of forming another semiconductor product having a plurality of parallel grooves on one surface.

When crystals of semiconductor material are placed in an etching solution, the rate of etching depends upon the crystallographic face which is presented to the solution. The present invention utilizes this effect to form a semiconductive product which has one or more grooves formed in one or more surfaces of the same.

In a single crystal with twin boundaries extending to the surface, different crystallographic faces are presented to the surface on either side of the twin boundary. That is, different crystallographic faces are presented by adjacent twin lamellae. When this crystal is placed in an etching solution, the different crystallographic faces are etched at different rates thereby resulting in a grooved surface. If there is a single twin boundary the surface is stepped, as will presently become apparent.

A crystal having one or more twin boundaries may be grown from a melt of the same material by properly seeding the same. For example, a plurality of wafers of the material having a thickness which corresponds to the desired width of the ridges and grooves are stacked and oriented whereby the ends which dip into the solution present different crystallographic faces. As is well known, at a twin boundary one part of the crystal presents atomically a mirror image of that part on the opposite side of the boundary. For example, in a diamond cubic crystal, the wafers should have a relative rotation of 60°. The seed is then lowered into the melt and withdrawn. As the seed is withdrawn, a crystal will grow which has a plurality of twin boundaries located at the adjacent edges of the various wafers or lamellae. Another method is to grow crystals until a crystal is grown having the desired configuration and spacing of twin boundaries. A seed is then cut from this crystal and used to seed succeeding crystals. Alternatively, the seed may be cut from a crystal grown by employing a plurality of adjacent properly oriented wafers as previously described.

Referring to the figures, Figure 1 shows a method for forming a crystal having one face which includes a single groove. In Figure 1A a block of semiconductive material has been cut from a crystal which included two twin boundaries 11 and 12. By properly seeding and growing an original crystal, the regions 13 and 14 present like crystallographic faces and the region 16 presents a different face. If the block is placed in an etching solution, the different regions of the crystal presenting different crystallographic faces are etched at different rates. Thus, if the face 16 etches more rapidly, a groove 17 is formed in the block (Figure 1B). It is, of course, to be understood that the figures are greatly enlarged to more clearly illustrate the invention and that dimensions for the width and depth of the grooves might be 0.0001 inch deep and 0.0001 inch wide with the ridges of comparable dimensions. However, it is to be understood that the depth and width of the grooves and ridges may be controlled by seeding the crystal to give closely or widely spaced twin boundaries as desired and by controlling the etching time to control the depth. If it is desired to form a step, a single twin boundary 18, as illustrated in Figure 2A, is formed and thus the crystal is etched to give the crystal of Figure 2B which includes step 19.

Figure 3:
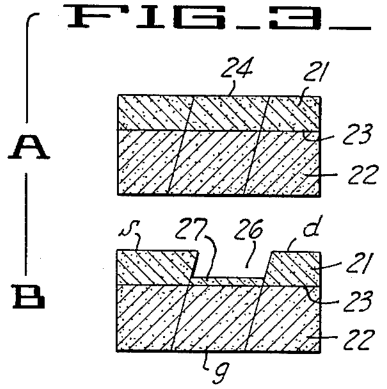

Referring to Figure 3, the formation of a field effect transistor is shown employing the method of the invention. The crystal, Figure 1A, is subjected to a diffusion operation on one surface thereof to form a region 21 conductivity type overlying a region 22 of opposite conductivity type whereby a junction 23 is formed (Figure 3A). The diffusion of the impurities into the crystal does not change the crystallographic face which is presented at the upper surface 24. Thus, when the crystal is subjected to an etching bath the groove 26 is formed (Figure 3B). By controlling the length of the period of etch, the groove may be made to penetrate as deep into the layer 21 as desired to form a relatively thin channel 27. Relatively thick ribs form the source *s* and drain *d* regions. Ohmic gate *g* contact may be made to the lower block 22. Operation of the field effect transistor is well known in the art. A voltage is applied between the source and drain which causes carriers to flow through the channel region. By varying the voltage applied at the junction 23, the space charge region is controlled and the flow of carriers through the channel is controlled.

Figure 4:
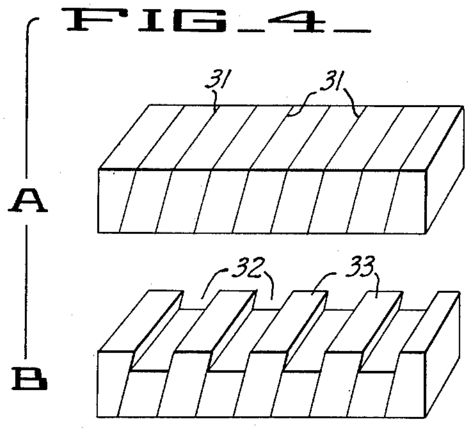

Referring to Figure 4, the formation of a product having a plurality of parallel grooves and ridges is shown. A crystal is grown with a plurality of twin boundaries 31 spaced as desired (Figure 4A). The block is then subjected to etching which serves to preferentially etch to form the grooves 32 which lie between the ridges 33 (Figure 4B). It is noted that the spacing of the various twin boundaries may be located as desired by suitable seeding technique. That is, by choosing wafers of the desired thicknesses, the twin boundaries may be located at various spacings one from the other. Thus, the grooves and ridges may be varied in thickness as desired. It is also apparent that the depth of the various grooves may be controlled by selecting the etching solution and etching time.

Thus, it is seen that an improved method for forming a semiconductor product having a grooved surface is provided. The spacing and width of grooves and ridges may be easily controlled. The grooves are relatively parallel and uniform.

I claim:

1. The method of manufacturing a semiconductor product which comprises the steps of growing a crystal having at least one twin boundary whereby different crystallographic faces are presented at the surface, and etching the crystal, said etching serving to etch different crystallographic faces at different rates.

2. The method of manufacturing a semiconductor product which comprises the steps of seeding a crystal with a seed having the crystallographic faces which it presents to the molten solution arranged in a predetermined manner, growing the crystal whereby at least one twin boundary is formed to present different crystal faces to the surface of the crystal, and subjecting the crystal to an etch, said etching serving to etch different crystallographic faces at different rates.

3. The method of manufacturing a semiconductor product which comprises growing a crystal with a plurality of twin boundaries extending to the surface of the crystal, subjecting the crystal to an etching solution whereby the different crystallographic faces presented to the surface are etched at different rates to provide a grooved surface.

4. A semiconductor product comprising a block of semiconductive material having at least one twin boundary therein, said block having a surface which is stepped at the boundary.

5. A semiconductor product which comprises a block of semiconductive material having a plurality of twin boundaries therein, with one surface of said block having a plurality of ridges and grooves formed therein, said ridges and grooves being defined by the twin boundaries formed in the crystal.

6. The method of manufacturing a semiconductor product which comprises the steps of growing a crystal having at least two twin boundaries whereby different crystallographic faces are presented to the surface, and etching the crystal, said etching serving to etch different crystallographic faces at different rates whereby one or more grooves are formed in the surface.

7. A semiconductor product comprising a block of semiconductive material having at least two twin boundaries therein, said block having a surface which has at least one ridge or one groove defined by the boundaries.

References Cited in the file of this patent

UNITED STATES PATENTS

| | | |
|---|---|---|
| 2,656,496 | Sparks | Oct. 20, 1953 |
| 2,740,700 | Fuller | Apr. 3, 1956 |
| 2,768,914 | Buehler et al. | Oct. 30, 1956 |
| 2,845,372 | Jones | July 29, 1958 |
| 2,858,730 | Hanson | Nov. 4, 1958 |